Figure 1:
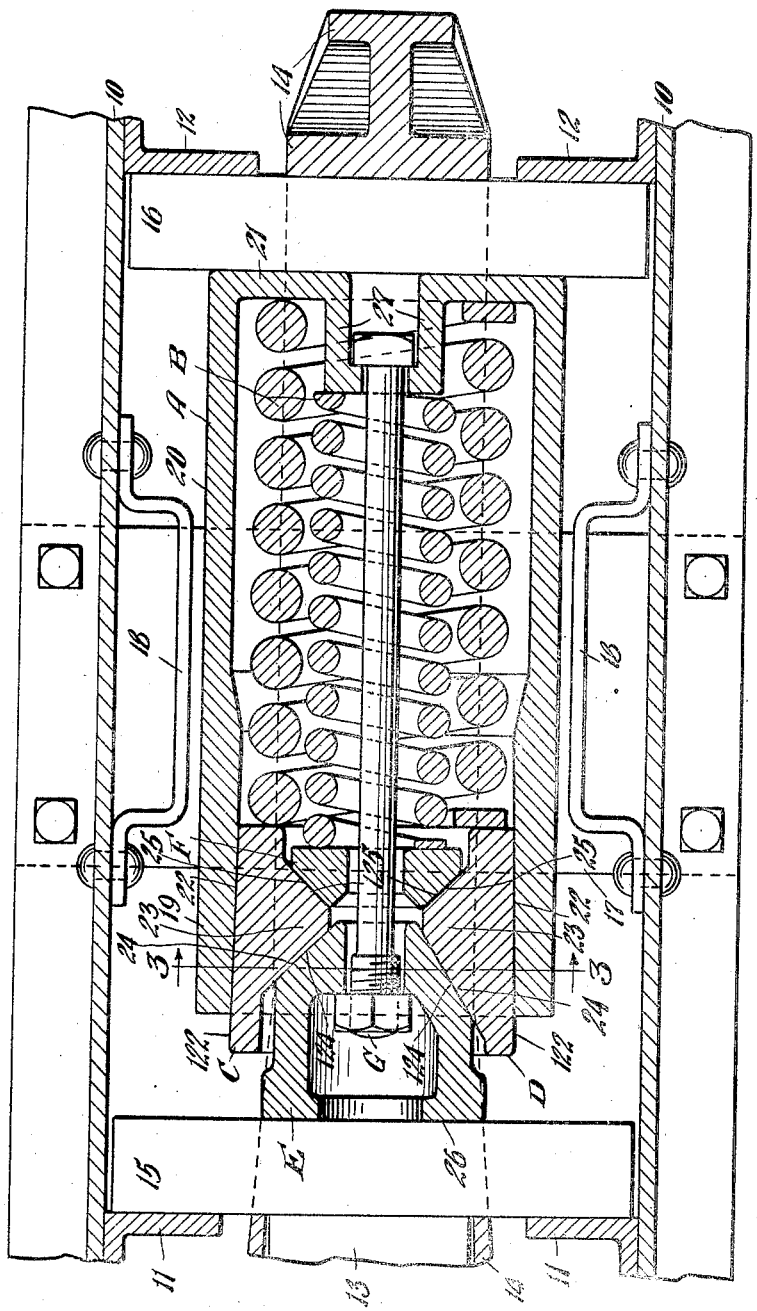

March 15, 1927.  S. B. HASELTINE  1,620,653
FRICTION SHOCK ABSORBING MECHANISM
Filed Aug. 13, 1926  2 Sheets-Sheet 1

Witness
Wm. Geiger

Inventor
Stacy B. Haseltine
By George I. Haight
His Atty.

March 15, 1927.
S. B. HASELTINE
1,620,653
FRICTION SHOCK ABSORBING MECHANISM
Filed Aug. 13, 1926  2 Sheets-Sheet 2
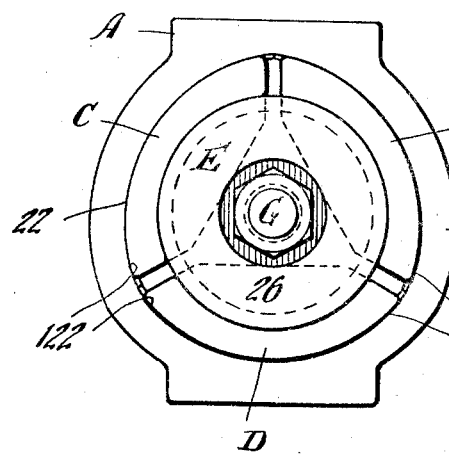
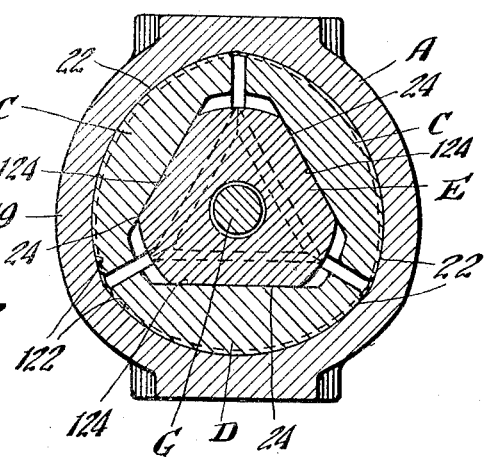
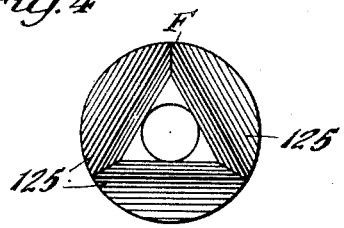
Witness
Wm. Geiger
Inventor
Stacy B. Haseltine
By George I. Haight
His Atty.

Patented Mar. 15, 1927.

1,620,653

UNITED STATES PATENT OFFICE.

STACY B. HASELTINE, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed August 13, 1926. Serial No. 128,951.

This invention relates to improvements in friction shock absorbing mechanisms.

One object of the invention is to provide a friction shock absorbing mechanism especially adapted for railway draft riggings, having high capacity and assured easy release.

A more specific object of the invention is to provide a friction shock absorbing mechanism including a friction shell; a plurality of friction shoes co-operating with the shell; wedge spreading means; and spring resistance means opposing inward movement of the parts of the wedge system, wherein the spring resistance comprises a plurality of spring elements, one of which directly engages a spring follower having wedging engagement with the shoes, and another element of which co-acts directly with the shoes independently of the remaining spring resistance elements, to prevent sticking of the parts, thereby assuring release of the mechanism.

Other objects and advantages of the invention will more fully and clearly appear from the description and claims hereinafter following.

In the drawing, forming a part of this specification, Figure 1 is a longitudinal, sectional view, partly broken away, of a portion of the railway draft rigging, showing my improvements in connection therewith, the section through the friction elements and wedge corresponding to two sectional planes intersecting at 120°. Figure 2 is a front end elevational view of the shock absorbing mechanism proper. Figure 3 is a transverse vertical sectional view corresponding substantially to the line 3—3 of Figure 1. And Figure 4 is a detailed front end elevational view of the spring follower employed in connection with my improved mechanism.

In said drawings, 10—10 indicate channel shaped center or draft sills of a railway car underframe, to the inner faces of which are secured front stop lugs 11—11 and rear stop lugs 12—12. The inner end portion of the drawbar is designated by 13, to which is operatively connected a hooded yoke 14 of well known form. The shock absorbing mechanism proper, as well as a front main follower 15 and a rear main follower 16, are operatively supported within the yoke. The yoke and the parts therewithin are supported in operative position by a detachable saddle plate 17 fixed to the draft sills. As illustrated, the improved shock absorbing mechanism is of that type embodying a substantially cylindrical shell and spring cage, and in order to maintain the same in centered position between the draft sills, suitable guide members 18—18 are secured to the inner sides of the draft sills.

The shock absorbing mechanism proper, as shown, comprises, broadly: a combined friction shell and spring cage casting A; a spring resistance B, including inner and outer coils; three friction shoes C, C and D; a central wedge E; a spring follower wedge cap F; and a retainer bolt G.

The combined friction shell and spring cage casting is of substantially cylindrical form throughout its length, with the friction shell proper 19 formed at the forward end thereof. The spring cage proper 20 is formed rearwardly of the friction shell. The casting has a transverse rear end wall 21 bearing on the front side of the rear main follower 16. The interior of the friction shell is provided with three independent, true cylindrical friction surfaces 22—22, converging inwardly of the shell.

The three friction shoes C, C and D are of like design, except as herein after pointed out. Each of the friction shoes C, C and D is provided with an outer longitudinally disposed cylindrical friction surface 122 adapted to co-operate with one of the friction surfaces 22 of the shell. On the inner side, that is, the side nearest the axis of the shell, the shoes are each provided with an enlargement 23 having wedge faces 24 and 25 thereon. The wedge faces 24 are disposed at the forward side of the enlargements 23 and co-operate with the wedge block E and the wedge faces 25 are disposed on the rear side of said enlargement and co-operate with the spring follower wedge cap F. The wedge faces 24 of the shoes C are preferably disposed at a relatively blunt releasing angle with reference to the longitudinal axis of the mechanism and the wedge face 24 of the shoe D is disposed at a relatively keen wedge acting angle with reference to said axis. The wedge E is in the form of a cast block having a front flat face 26 adapted to bear on the inner side of the front main follower 15. At the inner end, the wedge block is provided with three rearwardly converging wedge faces 124 adapted to co-operate respectively with the blunt wedge faces 24 of the shoes C and C and the keen wedge face 24 of the shoe D, the wedge faces being correspondingly inclined to the co-operating wedge faces of the shoes.

The spring follower F is in the form of a cylindrical block having three wedge faces 125 adapted to co-operate respectively with the wedge faces 25 at the rear ends of the three friction shoes. The wedge faces 25 and 125 are preferably so disposed as to provide a slight wedging action.

The spring resistance element B, which comprises an outer, relatively heavy coil, and an inner lighter coil, is interposed between the friction shoes and the rear end of the friction shell, the rear end of the outer coil bearing directly on the end wall 21 of the shell, and the rear end of the inner coil bearing on the front wall of a hollow boss 27 projecting forwardly from the rear wall 21. The inner coil of the spring has its front end bearing on the spring follower F only. The front end of the outer coil engages only the rear ends of the friction shoes.

The overall length of the mechanism is maintained by the retainer bolt G which has its opposite ends anchored respectively to the combined friction shell and spring cage casting and the wedge block E. The head of the bolt is disposed within the hollow boss 27 and the nut thereof is accommodated within the hollow portion of the wedge block. The shank of the bolt extends through the inner coil of the spring resistance and through aligned openings in the spring follower F and the wedge block E. The opening in the spring follower F is of such a size as to permit of free movement of the spring follower with respect to the retainer bolt. The retainer bolt is preferably adjusted to such a length as to maintain the spring resistance element B under an initial compression.

The operation of my improved shock absorbing mechanism, assuming an inward or buffing movement of the drawbar, is as follows: During the rearward movement of the drawbar, the front follower 15 will be moved rearwardly toward the follower 16 carrying the wedge block E therewith and forcing the friction shoes outwardly against the friction surfaces of the shell and also carrying the shoes inwardly against the resistance of the two coils of the spring B. Due to the keen wedge acting angle between the wedge and the shoe D, a high spreading action will be set up. During the compression stroke, due to the converging relation of the friction surfaces 22, the shoes C, C and D will be forced inwardly toward the axis of the mechanism, thereby augmenting the frictional resistance. This action will continue either until the actuating force is reduced, or the front follower is arrested by engagement with the front end of the shell, whereby the pressure will be transmitted directly through the shell to the rear follower and stop lugs, the shell acting as a solid column to transmit the pressure to the stop lugs and prevent the springs from being unduly compressed. The blunt co-acting wedge faces of the wedge block E and the shoes C—C will permit slippage of the shoes relatively to the wedge, thereby accommodating the lateral approach of the shoes due to the taper of the shell. During draft, the operation will be substantially the reverse of that just described, the front follower 15 being held stationary while the rear follower and shell are moved toward the same.

Due to the co-acting wedge faces on the spring follower and the three friction shoes C, C and D, there will also be a spreading action at the rear ends of the shoes, thus holding the inner ends of the shoes against the cylindrical friction surfaces of the shell and forcing them to do their work at all times, and especially in case there is a tilting action of the main wedge with respect to the shoes.

When the actuating force is reduced, the outer heavy coil of the spring resistance which acts directly on the friction shoes will force the shoes away from the spring follower E, thereby preventing sticking of the parts and assuring easy release.

It will be evident that the release of the mechanism is greatly facilitated due to the blunt and keen angle arrangement of the co-acting wedge faces of the wedge and friction shoes and also on account of the outer heavy coil of the spring resistance directly acting on the rear ends of the shoes to force the same outwardly independently of the spring follower F. In addition, it is pointed out that the blunt faces of the wedge block and shoes act in the manner of a "safety valve" to prevent sticking of the elements of the wedge system.

As will be evident to those skilled in the art, my invention is not limited to the blunt and keen angle arrangement of the wedge faces, it being within the invention to dispose all of the wedge faces at the same angle with reference to the longitudinal axis of the mechanism.

While I have herein shown and described what I now consider the preferred manner of carrying out my invention, the same is merely illustrative, and I contemplate all changes and modifications that come within the scope of the claims appended hereto.

I claim:

1. In a friction shock absorbing mechanism, the combination with a column acting element having a plurality of longitudinally disposed friction surfaces thereon; of a plurality of friction shoes co-operating with the friction surfaces; a wedge block co-operating with the shoes; spring follower means having wedging engagement with the shoes; spring resistance means opposing inward movement of said friction shoes; and spring resistance means opposing inward movement of said spring follower independently of said first named spring resistance means.

2. In a friction shock absorbing mechanism, the combination with a friction shell having interior, inwardly converging friction surfaces; of friction shoes co-operating with the shell friction surfaces; a wedge block co-operating with the shoes; a spring follower having wedging engagement with the shoes; an outer relatively heavy spring resistance element directly engaging the shoes and opposing inward movement thereof; and an inner, relatively lighter spring resistance opposing inward movement of said spring follower independently of said first named spring resistance.

3. In a friction shock absorbing mechanism, the combination with a friction shell having interior friction surfaces; of a plurality of friction shoes co-operating with said surfaces; a main wedge co-operating with said shoes; a spring follower, said spring follower and shoes having co-operating wedge faces; and a main spring resistance, including an element opposing movement of said shoes independently of the remainder of said spring resistance.

In witness that I claim the foregoing I have hereunto subscribed my name this 10th day of August, 1926.

STACY B. HASELTINE.